US011810282B2

(12) United States Patent
Sharma et al.

(10) Patent No.: US 11,810,282 B2
(45) Date of Patent: Nov. 7, 2023

(54) SYSTEM AND METHOD FOR QUANTITATIVE IMAGE QUALITY ASSESSMENT FOR PHOTOGRAMMETRY

(71) Applicant: Photogauge, Inc., Belmont, CA (US)

(72) Inventors: Sameer Sharma, Alamo, CA (US); Arunnelson Xavier, Alamo, CA (US); Sankara J. Subramanian, Alamo, CA (US)

(73) Assignee: Photogauge, Inc., Belmont, CA (US)

( * ) Notice: Subject to any disclaimer, the term of this patent is extended or adjusted under 35 U.S.C. 154(b) by 73 days.

(21) Appl. No.: 17/203,929

(22) Filed: Mar. 17, 2021

(65) Prior Publication Data

US 2021/0201469 A1    Jul. 1, 2021

Related U.S. Application Data

(63) Continuation-in-part of application No. 16/560,823, filed on Sep. 4, 2019, now Pat. No. 11,269,115.

(51) Int. Cl.
| | | |
|---|---|---|
| *G06T 7/00* | (2017.01) | |
| *G06V 10/98* | (2022.01) | |
| *G06V 20/20* | (2022.01) | |
| *G06V 10/44* | (2022.01) | |

(52) U.S. Cl.
CPC ............ *G06T 7/0002* (2013.01); *G06V 10/44* (2022.01); *G06V 10/993* (2022.01); *G06V 20/20* (2022.01)

(58) Field of Classification Search
CPC ........ G06T 7/0002; G06T 2207/30168; G06V 10/993; G06V 20/20; G06V 10/44
See application file for complete search history.

(56) References Cited

U.S. PATENT DOCUMENTS

| | | |
|---|---|---|
| 3,110,987 A | 11/1963 | Arneson |
| 6,850,858 B1 | 2/2005 | West |
| 7,361,941 B1 | 4/2008 | Lorusso |
| 7,473,502 B1 | 1/2009 | Ausschnitt |
| 7,788,818 B1 | 9/2010 | Tran |

(Continued)

OTHER PUBLICATIONS

Webpages from https://trapet.de/ dated Aug. 13, 2019.

*Primary Examiner* — Mohammad K Islam
(74) *Attorney, Agent, or Firm* — INVENTIVE LAW INC.; Jim H. Salter (57) ABSTRACT

A system and method for quantitative image quality assessment for photogrammetry are disclosed. An example embodiment is configured to receive one or more quality assessment images via an image receiver; process the quality assessment images to determine if a quality of the surface texture features of an object or environment depicted in the quality assessment images satisfies a pre-determined quality threshold, the pre-determined quality threshold corresponding to a likelihood of a satisfactory result if images of the object or environment are used for photogrammetry; generate an image quality map indicating image quality values corresponding to regions of the surface of the object or environment that have satisfactory or unsatisfactory texture features for photogrammetry; and generate instructions or prompts for a user, the instructions or prompts directing the user to perform actions with respect to the object or environment that will effect improvements of the texture features for satisfactory photogrammetry.

18 Claims, 7 Drawing Sheets

(56) References Cited

U.S. PATENT DOCUMENTS

| | | | |
|---|---|---|---|
| 8,345,243 B2 | 1/2013 | Ghinovker | |
| 8,826,719 B2 | 9/2014 | Weekers | |
| 9,609,288 B1* | 3/2017 | Richman | G05D 1/042 |
| 2002/0185053 A1 | 12/2002 | Fei | |
| 2014/0180620 A1 | 6/2014 | Hicks | |
| 2018/0058840 A1 | 3/2018 | Lamendola | |
| 2018/0336737 A1* | 11/2018 | Varady | G06T 3/0068 |
| 2019/0114847 A1* | 4/2019 | Wagner | G05D 1/0016 |
| 2020/0258028 A1* | 8/2020 | Pohl | G06T 17/05 |
| 2020/0279389 A1* | 9/2020 | McIver | G06T 7/12 |
| 2022/0067229 A1* | 3/2022 | Kaufmann | G06T 17/00 |

\* cited by examiner

```
                    ┌─────────────────────────────────────┐
                    │ Quantitative Image Quality Assessment│
                    │     For Photogrammetry              │
                    │        Processing Logic             │
                    │            -2000-                   │
                    └─────────────────────────────────────┘
                                     │
                                     ▼
                    ┌─────────────────────────────────────┐
                    │ Receive one or more quality          │
                    │ assessment images via an image       │
                    │ receiver.                            │
                    │            -2010-                    │
                    └─────────────────────────────────────┘
                                     │
                                     ▼
                    ┌─────────────────────────────────────┐
                    │ Process the quality assessment       │
                    │ images to determine if a quality of  │
                    │ the surface texture features of an   │
                    │ object or environment depicted in    │
                    │ the quality assessment images        │
                    │ satisfies a pre-determined quality   │
                    │ threshold, the pre-determined        │
                    │ quality threshold corresponding to a │
                    │ likelihood of a satisfactory result  │
                    │ if images of the object or           │
                    │ environment are used for             │
                    │ photogrammetry.                      │
                    │            -2020-                    │
                    └─────────────────────────────────────┘
                                     │
                                     ▼
                    ┌─────────────────────────────────────┐
                    │ Generate an image quality map        │
                    │ indicating image quality values      │
                    │ corresponding to regions of the      │
                    │ surface of the object or environment │
                    │ that have satisfactory or            │
                    │ unsatisfactory texture features for  │
                    │ photogrammetry.                      │
                    │            -2030-                    │
                    └─────────────────────────────────────┘
                                     │
                                     ▼
                    ┌─────────────────────────────────────┐
                    │ Generate instructions or prompts for │
                    │ a user, the instructions or prompts  │
                    │ directing the user to perform        │
                    │ actions with respect to the object   │
                    │ or environment that will effect      │
                    │ improvements of the texture features │
                    │ for satisfactory photogrammetry.     │
                    │            -2040-                    │
                    └─────────────────────────────────────┘
                                     │
                                     ▼
                                  ( End )
```

SYSTEM AND METHOD FOR QUANTITATIVE IMAGE QUALITY ASSESSMENT FOR PHOTOGRAMMETRY

PRIORITY PATENT APPLICATION

This is a continuation-in-part patent application claiming priority to U.S. non-provisional patent application Ser. No. 16/560,823, filed on Sep. 4, 2019. This present patent application draws priority from the referenced patent application. The entire disclosure of the referenced patent application is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the disclosure provided herein and to the drawings that form a part of this document: Copyright 2018-2021 PhotoGAUGE, Inc., All Rights Reserved.

TECHNICAL FIELD

This patent application relates to computer-implemented software systems, metrology systems, photogrammetry-based systems, and automatic visual measurement or inspection systems, according to example embodiments, and more specifically to a system and method for quantitative image quality assessment for photogrammetry.

BACKGROUND

Photogrammetry refers to the science of making measurements from photographs. The input to photogrammetry is photographs or images, and the output is typically a map, a drawing, a measurement, or a three-dimensional (3D) model of some real-world object or scene. Photographs or images for photogrammetry can be obtained from a variety of sources, including using aircraft (aerial photogrammetry), cameras on tripods, or even cameras held by hand (terrestrial or close-range photogrammetry).

Regardless of how the photographs or images are taken or obtained, photogrammetry involves computing the relative poses of the camera(s) that acquired the photographs and then computing the accurate 3D geometry of the real-world scene or object being photographed. In order to accurately compute the camera poses, one of the common approaches taken is to first identify unique surface features in each image and then match corresponding features across images. For robust matching of images, and therefore accurate identification of camera poses, one needs a large number (typically 1000's or larger) of strong surface features from each image. Surfaces with a high density of surface features lead to smooth and dense 3D reconstructions of the object and accurate measurements. In contrast, poor surface texture leads to rough surface modeling, missing regions, and low-quality measurements.

Surface features, in turn, strongly depend on the visual texture, such as the shape, tone, and color depth of the objects in the images. The richer the texture captured in the images, the more features that can be detected. Visual texture is affected by the true nature of the object surface, but also external conditions such as lighting, shadows, etc.

Thus, the success of photogrammetry depends critically on the texture of the imaged objects in the photographs or images. However, existing photogrammetry tools do not offer a way to quantify the quality of the surface texture of an object before acquiring photographs of the object. Existing photogrammetry tools cannot determine if the images of an object do not possess adequate texture for successful photogrammetry. Poor surface texture of an object is often only discovered from the poor quality of the photogrammetry results rather than prior to image capture when suitable intervention could be attempted to improve the surface texture of the object for imaging (e.g., by changing lighting, spraying a light coat of powder or paint on the object, etc.).

SUMMARY

In various example embodiments described herein, a system and method for quantitative image quality assessment for photogrammetry are disclosed. In the various example embodiments described herein, an image quality assessment, tool is provided to address the shortcomings of the conventional photogrammetry tools as described above. The image quality assessment tool of various example embodiments can be advantageously used wherever image characteristics, such as texture, brightness, and contrast, must be quantitatively assessed.

An example embodiment as disclosed herein includes a system and process that can assess the spatial and frequency content of an image, compute one or more image quality metrics, and perform other mathematical analysis to assess whether the metrics meet the desired image quality requirements.

The output of an example embodiment can include, but is not limited to, a Pass/Fail determination, which can include a quantitative map of the image quality metrics overlaid on the image thereby showing areas of the image that have good, marginal, or poor surface texture. The output of an example embodiment can also include, but is not limited to, an identification of shadows and highlights, and recommendations to the user for improving texture in areas where the imaged texture is poor (e.g., "Please speckle this area lightly with white powder to improve texture").

The image quality assessment tool of the various example embodiments can be used with images of any resolution obtained from any type of camera or imaging device that produces an RGB or grayscale image. The image quality assessment tool of the various example embodiments can be deployed on any computational device including a smartphone, a personal computer or other client device, and also on a cloud computing platform. The image quality assessment tool of the various example embodiments can be used on objects of any size, shape, or material. Details of the various example embodiments are provided below.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a system and method for quantitative image quality assessment for photogrammetry are disclosed. In the various example embodiments described herein, an image quality assessment system can be implemented on a computing platform, such as the computing platform described below in connection with FIG. 7. Additionally, the image quality assessment system of an example embodiment can be implemented with an imaging system or imaging capability to capture quality assessment images of an object or an environment for which photogrammetry is to be performed. However, an imaging system or imaging capability is not a required part of the image quality assessment system as the image quality assessment system can use images of an object or environment that are captured independently or separately from the image quality assessment system.

As described in more detail below, the image quality assessment system of an example embodiment can receive or capture quality assessment images of an object or an environment for which photogrammetry is to be performed. The image quality assessment system can process the quality assessment images to determine the sufficiency and coverage of surface texture features of objects or environments depicted in the quality assessment images. A lack of surface texture features and/or their insufficient coverage depicted in the quality assessment images is indicative of the likelihood of a poor result if images of the object or environment are used for photogrammetry. In contrast, a sufficiency and broad coverage of surface texture features of objects or environments depicted in the quality assessment images is indicative of the likelihood of a satisfactory result if images of the object or environment are used for photogrammetry. Upon completion of the processing of the quality assessment images by the image quality assessment system of an example embodiment, the image quality assessment system can provide at least three types of output or assessment results.

Firstly, the image quality assessment system can generate an image quality map indicating image quality values corresponding to regions of the surface of the object or environment that have satisfactory or unsatisfactory texture features for photogrammetry. In this manner, a user can see a visual representation of the object or environment and the image quality values corresponding to particular portions of the object or environment that need improved texture features for satisfactory photogrammetry.

Secondly, the image quality assessment system of an example embodiment can generate instructions or prompts for the user, which can direct the user to perform actions with respect to the object or environment that will effect the needed improvements of the texture features for satisfactory photogrammetry.

Thirdly, the image quality assessment system can generate an image quality threshold overlay indicating regions of the surface of the object or environment that have satisfactory or unsatisfactory texture features for photogrammetry. The image quality threshold overlay is configured to be overlaid on the object image so the surface texture quality of particular regions of the object is clearly visible. In this manner, a user can see a visual representation of the object or environment and the particular portions of the object or environment that need improved texture features for satisfactory photogrammetry. The processing performed and the outputs produced by the image quality assessment system are described in more detail below. However, it is important to first describe the problems encountered when objects or environments have poor surface texture features and how this poor surface texture can affect photogrammetry and related 3D reconstruction or modeling.

Figure 1A:
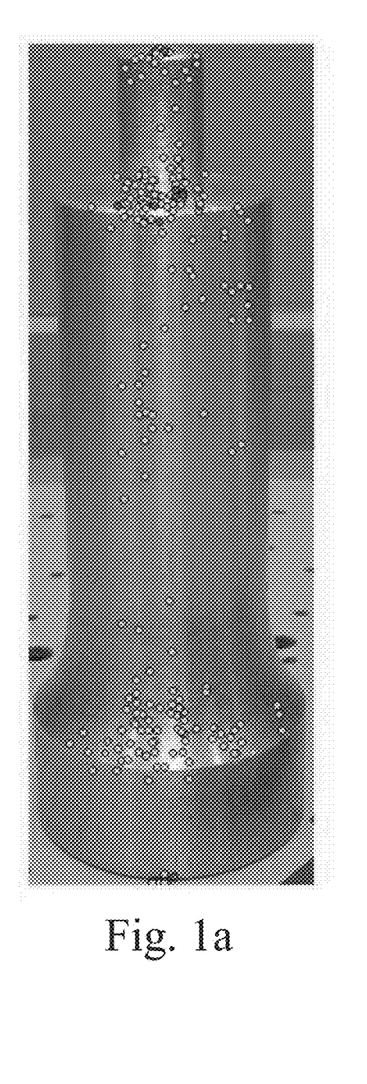
FIG. 1a illustrates a sample object with a shiny surface for which the photogrammetry 3D reconstruction fails completely (i.e., no geometry output) because of the lack of surface texture features on the object.

FIG. 1a illustrates a sample object with a shiny surface for which the photogrammetry 3D reconstruction fails completely (i.e., no geometry output) because of the lack of surface texture features on the object. Shiny surfaces on objects don't provide texture features that sufficiently define the surface of the object. As a result, photogrammetry processing will be unable to properly model the object.

Figure 1B:
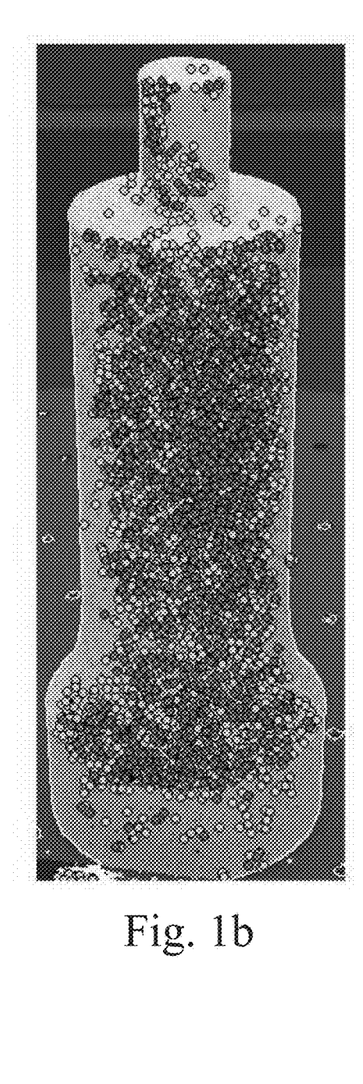
FIG. 1b illustrates the same sample object of FIG. 1a with its surface textured using black and white paint, providing a dense array of features.

FIG. 1b illustrates the same sample object of FIG. 1a with its surface textured using black and white paint, providing a dense array of surface texture features. The dense array of surface texture features on the object sufficiently define the surface of the object. As a result, photogrammetry processing can satisfactorily generate a related 3D reconstruction or modeling of the object.

Figure 1C:
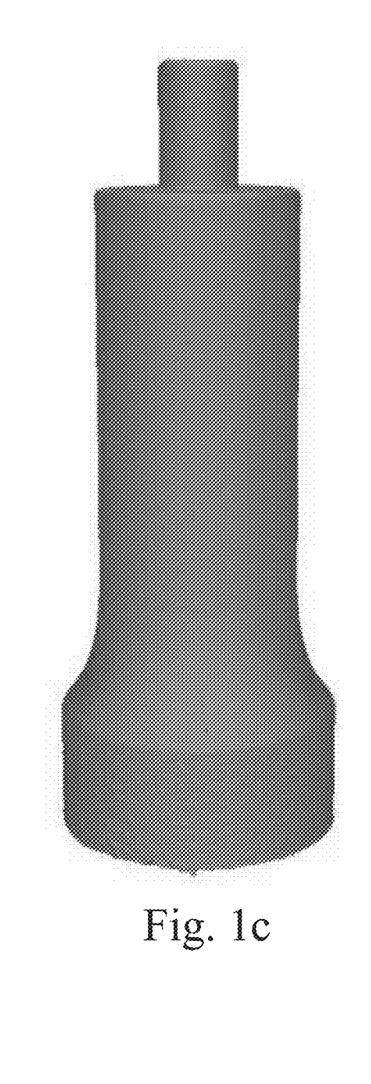
FIG. 1c illustrates a result of photogrammetry processing of the same sample object of FIG. 1b with the strong surface texture features leading to a smooth and dense 3D reconstruction or modeling of the object.

FIG. 1c illustrates a result of photogrammetry processing of the same sample object of FIG. 1b with the strong surface texture features leading to a smooth and dense 3D reconstruction or modeling of the object. Because the capture of images and photogrammetry processing of an object or environment can be expensive or time-consuming, it is beneficial to determine prior to image capture and photogrammetry processing if the object or environment being processed has an acceptable level and coverage of surface texture features for photogrammetry. The image quality assessment system of an example embodiment provides this determination.

Figure 2A:
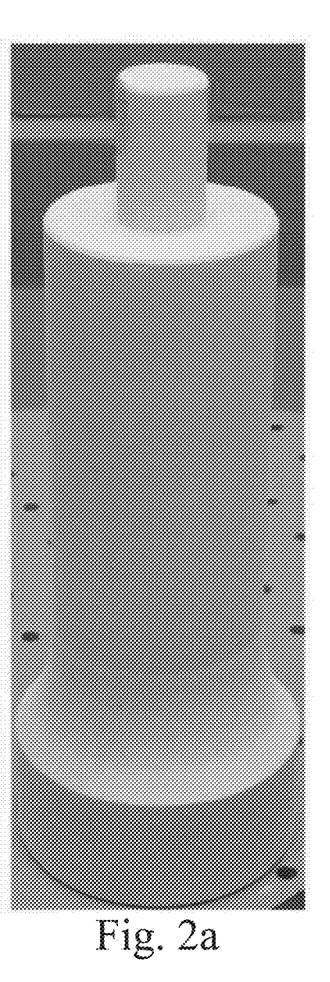
FIG. 2a illustrates a sample object with a dull, but texture-less surface having a lack of surface texture features on the object.

FIG. 2a illustrates a sample object with a dull, but texture-less surface having a lack of surface texture features on the object. As with the shiny object shown in FIG. 1a and described above, the dull and texture-less object shown in FIG. 2a doesn't provide surface texture features that sufficiently define the surface of the object. As a result, photogrammetry processing will be unable to properly model the object.

Figure 2B:
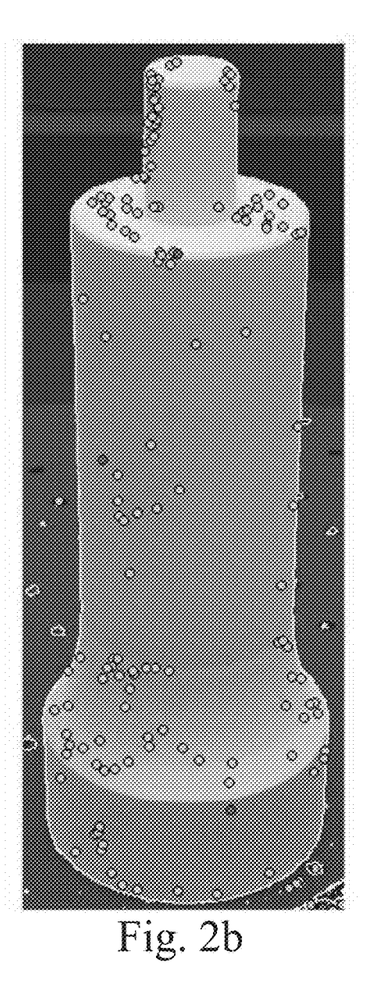
FIG. 2b illustrates the same sample object of FIG. 2a showing the insufficient density of surface texture features.

FIG. 2b illustrates the same sample object of FIG. 2a showing the insufficient density of surface texture features, thereby rendering the object a poor candidate for photogrammetry processing.

Figure 2C:
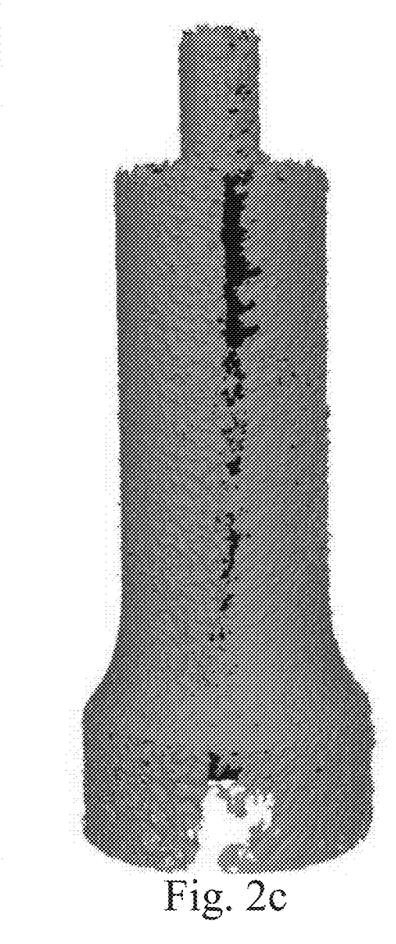
FIG. 2c illustrates the poor 3D reconstruction of the same sample object of FIG. 2a showing holes and rough surfaces, because of the insufficient density of surface texture features on the object.

FIG. 2c illustrates the poor 3D reconstruction of the same sample object of FIGS. 2a and 2b showing holes and rough surfaces, because of the insufficient density of surface texture features on the object. The image quality assessment system of an example embodiment provides a solution to avoid these unsatisfactory photogrammetry processing results.

Figure 3A:
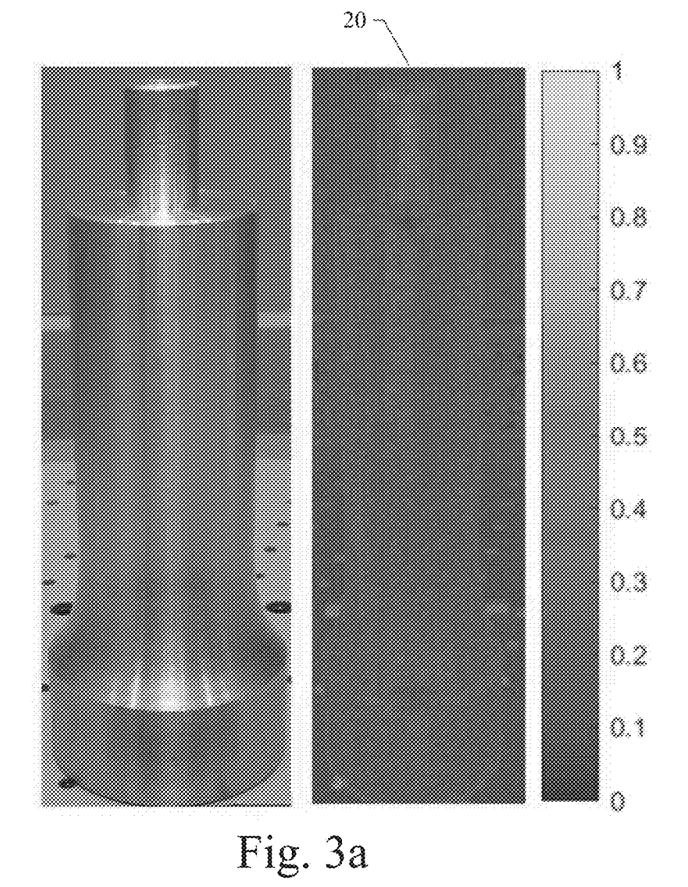
FIG. 3a illustrates a result of an example embodiment processing a sample object with weak (shiny) surface texture features, the result including an image quality map indicating low image quality values corresponding to shiny portions of the imaged object.

FIG. 3a illustrates a result of the processing performed by the image quality assessment system of an example embodiment. In the example shown, the image quality assessment system has processed a sample object with weak (shiny) surface texture features. The image quality assessment system has produced a result including an image quality map 20 indicating low image quality values corresponding to shiny portions of the imaged object.

Figure 3B:
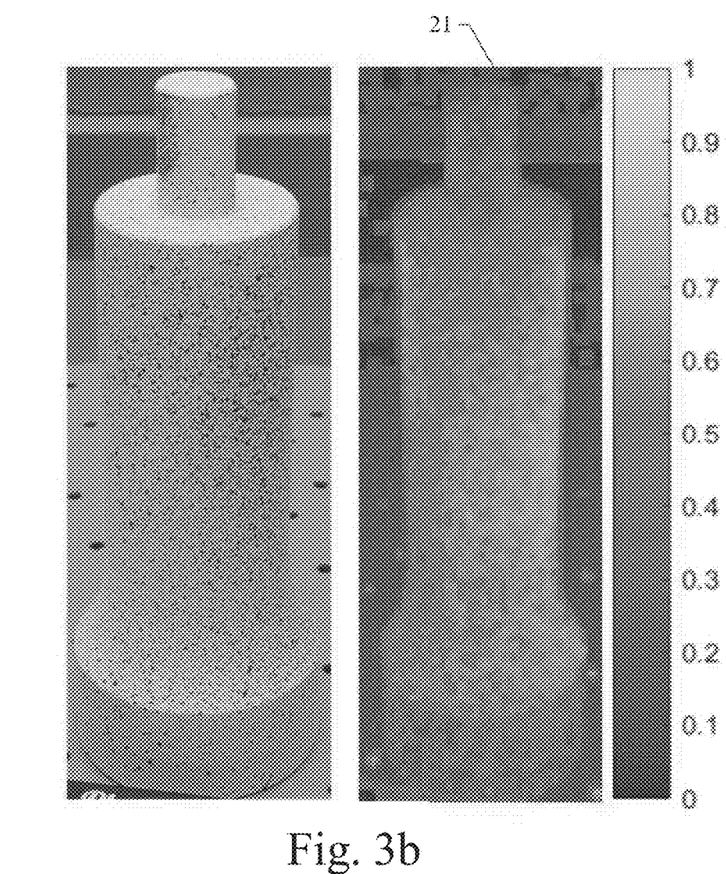
FIG. 3b illustrates a result of an example embodiment processing a sample object with satisfactory surface texture features, the result including an image quality map indicating high image quality values corresponding to portions of the imaged object with good surface texture features.

FIG. 3b illustrates a result of the processing performed by the image quality assessment system of an example embodiment. In the example shown, the image quality assessment system has processed a sample object with satisfactory surface texture features. The image quality assessment system has produced a result including an image quality map 21 indicating high image quality values corresponding to portions of the imaged object with good surface texture features. The image quality map 21 produced by the image quality assessment system enables a user to see a visual representation of the object or environment and the particular portions of the object or environment that need improved texture features for satisfactory photogrammetry.

Figure 4A:
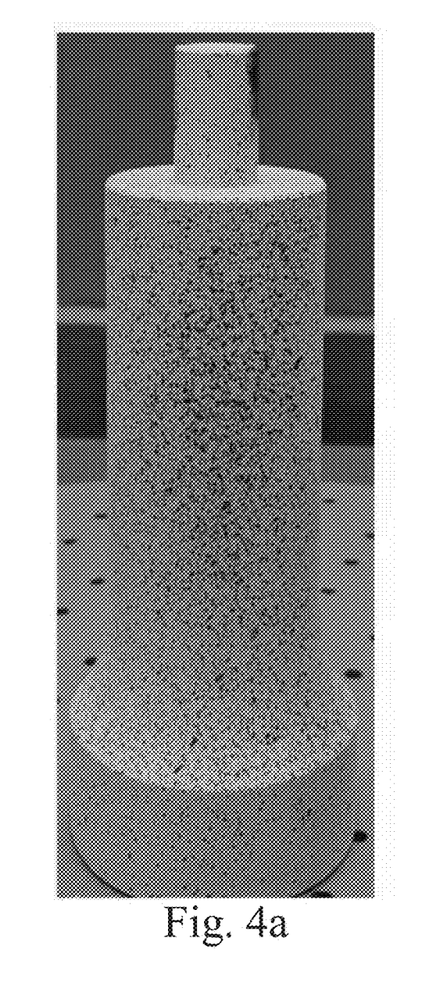
FIG. 4a illustrates a sample object with a sufficiently textured surface and having a sufficient quantity and arrangement of surface texture features on the object.

FIG. 4a illustrates a sample object with a sufficiently textured surface and having a sufficient quantity and arrangement of surface texture features on the object.

Figure 4B:
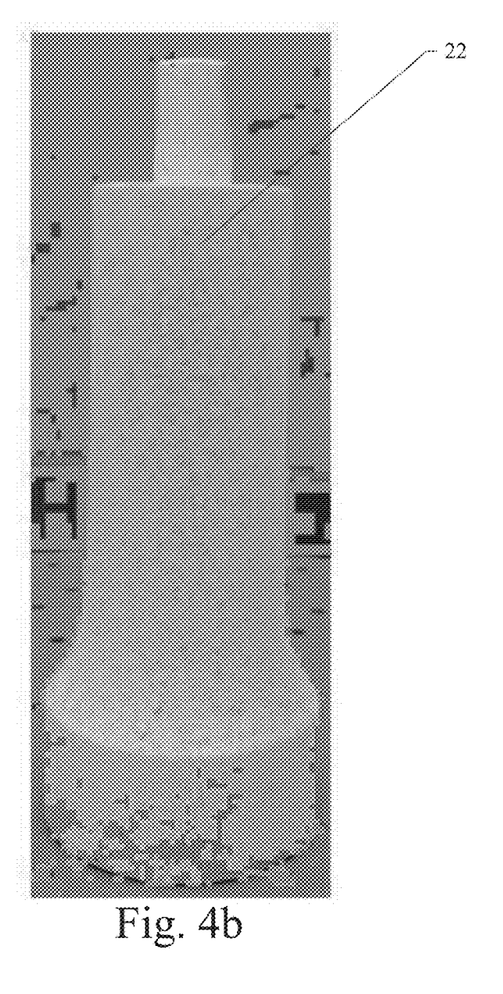
FIG. 4b illustrates a result of an example embodiment processing the sample object of FIG. 4a with satisfactory surface texture features, the result including an image quality threshold overlay indicating high image quality values corresponding to portions of the imaged object with good surface texture features, the image quality threshold overlay showing regions of the object image having an image quality exceeding a predetermined image quality threshold.

FIG. 4b illustrates a result of the processing performed by the image quality assessment system of an example embodiment, where processing is performed on the sample object of FIG. 4a with satisfactory surface texture features. In the example of FIG. 4b, the image quality assessment system has produced a result including an image quality threshold overlay 22 indicating high image quality values corresponding to portions of the imaged object with good surface texture features. The image quality threshold overlay 22 can show particular regions of the object having a surface texture quality exceeding a predetermined image quality threshold. The image quality threshold overlay 22 is also configured to be overlaid on the object image so the surface texture quality of particular regions of the object is clearly visible.

Figure 5:
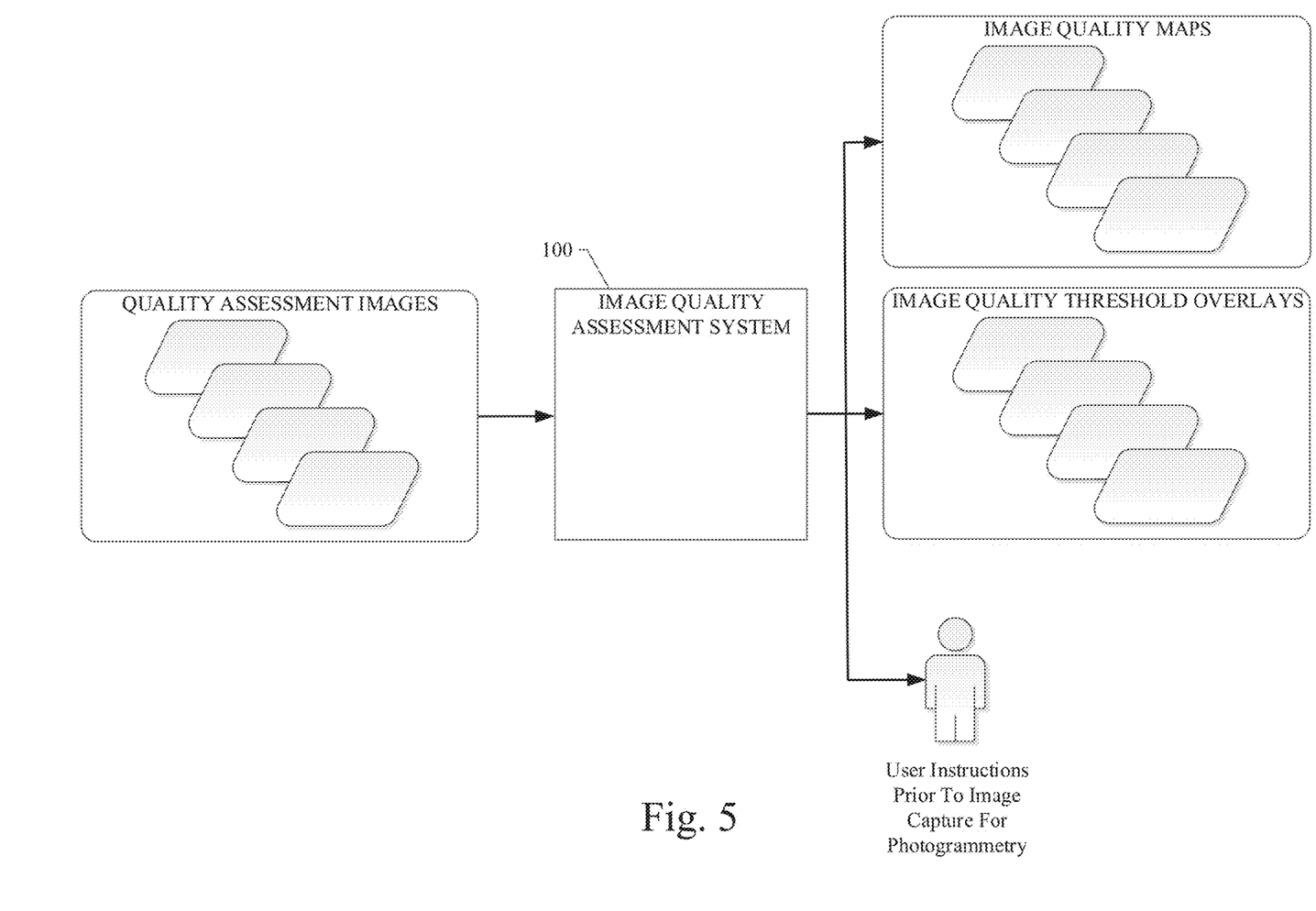
FIG. 5 is a structure diagram that illustrates example embodiments of systems as described herein.

FIG. 5 is a structure diagram that illustrates example embodiments of systems as described herein. The image quality assessment system 100 of an example embodiment can be configured as a software application executable by a data processor. The data processor can be in data communication with an image receiver configured to receive one or more quality assessment images. As shown in FIG. 5, the image quality assessment system 100 of an example embodiment can receive or capture quality assessment images of an object or an environment for which photogrammetry is to be performed. The image quality assessment system 100 can process the quality assessment images to determine the sufficiency and coverage of surface texture features of objects or environments depicted in the quality assessment images as described above. A lack of sufficiency and/or coverage of surface texture of objects or environments depicted in the quality assessment images (e.g., unsatisfactory quality) is indicative of the likelihood of a poor result if images of the object or environment are used for photogrammetry. In contrast, a sufficiency and broad coverage of surface texture features of objects or environments depicted in the quality assessment images (e.g., satisfactory quality) is indicative of the likelihood of a satisfactory result if images of the object or environment are used for photogrammetry. Upon completion of the processing of the quality assessment images by the image quality assessment system 100 of an example embodiment, the image quality assessment system 100 can provide as least three types of output or assessment results as shown in FIG. 5.

Firstly, the image quality assessment system 100 can generate an image quality map indicating image quality values corresponding to regions of the surface of the object or environment that have satisfactory or unsatisfactory texture features for photogrammetry. In this manner, a user can see a visual representation of the object or environment and the image quality values corresponding to particular portions of the object or environment that need improved texture features for satisfactory photogrammetry.

Secondly, the image quality assessment system 100 of an example embodiment can generate instructions or prompts for the user, which can direct the user to perform actions with respect to the object or environment that will effect the needed improvements of the texture features for satisfactory photogrammetry. For example, the image quality assessment system 100 can be configured to automatically send text messages, email messages, user interface messages, or the like to instruct the user to apply texture to particular portions of the object or environment, the particular portions having image quality values below a pre-determined threshold.

Thirdly, the image quality assessment system 100 can generate an image quality threshold overlay, as described above, indicating regions of the surface of the object or environment that have satisfactory or unsatisfactory texture features for photogrammetry. The image quality threshold overlay is configured to be overlaid on the object image so the surface texture quality of particular regions of the object is clearly visible. In this manner, a user can see a visual representation of the object or environment and the particular portions of the object or environment that need improved texture features for satisfactory photogrammetry.

Figure 6:
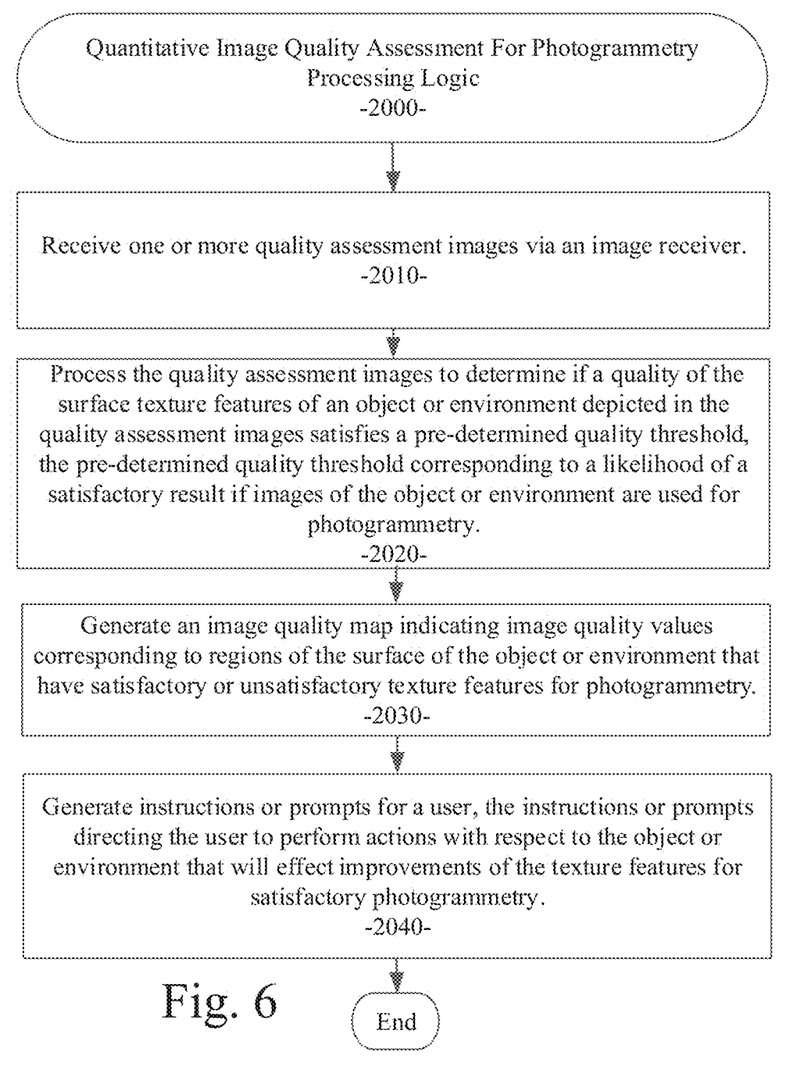
FIG. 6 is a processing flow diagram that illustrates example embodiments of methods as described herein.

Referring now to FIG. 6, a processing flow diagram illustrates an example embodiment of a method implemented by the example embodiments as described herein. The method 2000 of an example embodiment can be configured to: receive one or more quality assessment images via an image receiver (processing block 2010); process the quality assessment images to determine if a quality of the surface texture features of an object or environment depicted in the quality assessment images satisfies a pre-determined quality threshold, the pre-determined quality threshold corresponding to a likelihood of a satisfactory result if images of the object or environment are used for photogrammetry (processing block 2020); generate an image quality map indicating image quality values corresponding to regions of the surface of the object or environment that have satisfactory or unsatisfactory texture features for photogrammetry (processing block 2030); and generate instructions or prompts for a user, the instructions or prompts directing the user to perform actions with respect to the object or environment that will effect improvements of the texture features for satisfactory photogrammetry (processing block 2040).

Figure 7:
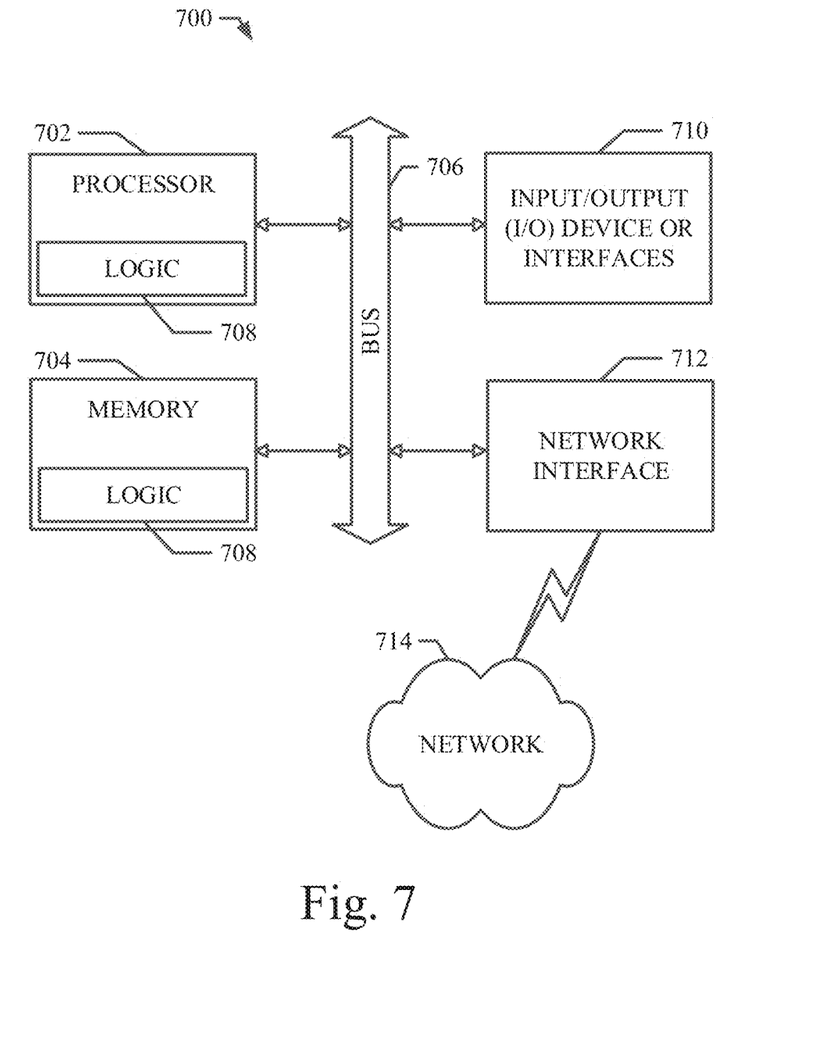
FIG. 7 shows a diagrammatic representation of a machine in the example form of a computer system within which a set of instructions when executed may cause the machine to perform any one or more of the methodologies discussed herein.

FIG. 7 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

As described herein for various example embodiments, a system and method for quantitative image quality assessment for photogrammetry are disclosed. In various embodiments, a software application program is used to enable the capture and processing of images on a computing or communication system, including mobile devices. As described above, in a variety of contexts, the various example embodiments can be configured to automatically capture images of a part/object being inspected, all from the convenience of a portable electronic device, such as a smartphone. This collection of images can be processed and results can be distributed to a variety of network users. As such, the various embodiments as described herein are necessarily rooted in computer and network technology and serve to improve these technologies when applied in the manner as presently claimed. In particular, the various embodiments described herein improve the use of mobile device technology and data network technology in the context of automated object visual inspection via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a data processor;
an image receiver in data communication with the data processor; and
an image quality assessment system executable by the data processor, the image quality assessment system configured to:
receive one or more quality assessment images via the image receiver;
process the quality assessment images to determine if a quality of the surface texture features of an object or environment depicted in the quality assessment images satisfies a pre-determined quality threshold, the pre-determined quality threshold corresponding to a likelihood of a satisfactory result if images of the object or environment are used for photogrammetry;
generate an image quality map indicating image quality values corresponding to regions of the surface of the object or environment that have satisfactory or unsatisfactory texture features for photogrammetry;
generate instructions or prompts for a user, the instructions or prompts directing the user to perform actions with respect to the object or environment that will effect improvements of the texture features for satisfactory photogrammetry; and
initiate photogrammetry processing of the object images if the image quality map indicates the object images have an acceptable level and coverage of surface texture features for photogrammetry.

2. The system of claim 1 wherein the image quality assessment system being further configured to generate an image quality threshold overlay indicating regions of the surface of the object or environment that have satisfactory or unsatisfactory texture features for photogrammetry.

3. The system of claim 1 wherein the instructions or prompts for the user include automatically sent text messages, email messages, or user interface messages to instruct the user to apply texture to particular portions of the object or environment.

4. The system of claim 1 wherein the image quality map and the instructions or prompts for the user are generated prior to performing photogrammetry on the object or environment.

5. The system of claim 1 wherein the image quality map includes information indicative of image quality values.

6. The system of claim 2 wherein the image quality threshold overlay is shown overlaid on an image of the object or environment.

7. A method comprising:
receiving one or more quality assessment images via an image receiver;
processing the quality assessment images, by use of a data processor, to determine if a quality of the surface texture features of an object or environment depicted in the quality assessment images satisfies a pre-determined quality threshold, the pre-determined quality threshold corresponding to a likelihood of a satisfactory result if images of the object or environment are used for photogrammetry;
generating an image quality map indicating image quality values corresponding to regions of the surface of the object or environment that have satisfactory or unsatisfactory texture features for photogrammetry;
generating instructions or prompts for a user, the instructions or prompts directing the user to perform actions with respect to the object or environment that will effect improvements of the texture features for satisfactory photogrammetry; and
initiating photogrammetry processing of the object images if the image quality map indicates the object images have an acceptable level and coverage of surface texture features for photogrammetry.

8. The method of claim 7 including generating an image quality threshold overlay indicating regions of the surface of the object or environment that have satisfactory or unsatisfactory texture features for photogrammetry.

9. The method of claim 7 wherein the instructions or prompts for the user include automatically sent text messages, email messages, or user interface messages to instruct the user to apply texture to particular portions of the object or environment.

10. The method of claim 7 wherein the image quality map and the instructions or prompts for the user are generated prior to performing photogrammetry on the object or environment.

11. The method of claim 7 wherein the image quality map includes information indicative of image quality values.

12. The method of claim 8 wherein the image quality threshold overlay is shown overlaid on an image of the object or environment.

13. A non-transitory machine-useable storage medium embodying instructions which, when executed by a machine, cause the machine to:
receive one or more quality assessment images via an image receiver;
process the quality assessment images to determine if a quality of the surface texture features of an object or environment depicted in the quality assessment images satisfies a pre-determined quality threshold, the pre-determined quality threshold corresponding to a likelihood of a satisfactory result if images of the object or environment are used for photogrammetry;
generate an image quality map indicating image quality values corresponding to regions of the surface of the object or environment that have satisfactory or unsatisfactory texture features for photogrammetry;
generate instructions or prompts for a user, the instructions or prompts directing the user to perform actions with respect to the object or environment that will effect improvements of the texture features for satisfactory photogrammetry; and
initiate photogrammetry processing of the object images if the image quality map indicates the object images have an acceptable level and coverage of surface texture features for photogrammetry.

14. The non-transitory machine-useable storage medium of claim 13 being further configured to generate an image quality threshold overlay indicating regions of the surface of the object or environment that have satisfactory or unsatisfactory texture features for photogrammetry.

15. The non-transitory machine-useable storage medium of claim 13 wherein the instructions or prompts for the user include automatically sent text messages, email messages, or user interface messages to instruct the user to apply texture to particular portions of the object or environment.

16. The non-transitory machine-useable storage medium of claim 13 wherein the image quality map and the instructions or prompts for the user are generated prior to performing photogrammetry on the object or environment.

17. The non-transitory machine-useable storage medium of claim 13 wherein the image quality map includes information indicative of image quality values.

18. The non-transitory machine-useable storage medium of claim 14 wherein the image quality threshold overlay is shown overlaid on an image of the object or environment.

* * * * *